(12) United States Patent
Hughes

(10) Patent No.: US 6,269,780 B1
(45) Date of Patent: Aug. 7, 2001

(54) WATER HEATER HEAT TRAP

(75) Inventor: Dennis R. Hughes, Hartford, WI (US)

(73) Assignee: AOS Holding Company, Wilmington, DE (US)

( * ) Notice: Subject to any disclaimer, the term of this patent is extended or adjusted under 35 U.S.C. 154(b) by 0 days.

(21) Appl. No.: 09/493,716

(22) Filed: Jan. 28, 2000

(51) Int. Cl.$^7$ .................................... F22B 5/00
(52) U.S. Cl. .................. 122/14.3; 122/14.31; 137/845; 137/846; 137/855
(58) Field of Search .................. 122/14.3, 14.31; 137/855, 846, 845

(56) References Cited

U.S. PATENT DOCUMENTS

| 571,708 | 11/1896 | Thompson . |
|---|---|---|
| 1,991,557 | 2/1935 | Johnson . |
| 2,813,543 | 11/1957 | Todd . |
| 2,937,658 | 5/1960 | Stewart . |
| 3,144,904 | 8/1964 | Kahn et al. . |
| 3,200,571 | 8/1965 | Shufflebotham . |
| 3,283,481 | 11/1966 | Studley et al. . |
| 3,701,560 | 10/1972 | Emmerson . |
| 3,750,710 | 8/1973 | Hayner . |
| 4,286,573 | 9/1981 | Nickel . |
| 4,579,104 | 4/1986 | Snavely . |
| 4,964,394 | * 10/1990 | Threatt ............................. 122/14.31 |
| 5,169,393 | 12/1992 | Moorehead et al. . |
| 5,277,171 | 1/1994 | Lannes . |
| 5,577,491 | 11/1996 | Lewis . |
| 5,660,802 | 8/1997 | Archer et al. . |
| 5,794,661 | 8/1998 | Natalizia . |

* cited by examiner

Primary Examiner—Jiping Lu
(74) Attorney, Agent, or Firm—Michael Best & Friedrich LLP

(57) ABSTRACT

A water heater includes a spud connected to a tank wall and surrounding an opening in the tank wall. A support surface is provided in the spud, preferably by the tank wall, that supports a heat trap within the spud. A pipe is inserted into the spud and a portion of the heat trap is disposed between the end of the pipe and the support surface. The heat trap preferably includes and elongated portion that acts as a dielectric between the tank and the pipes.

12 Claims, 2 Drawing Sheets

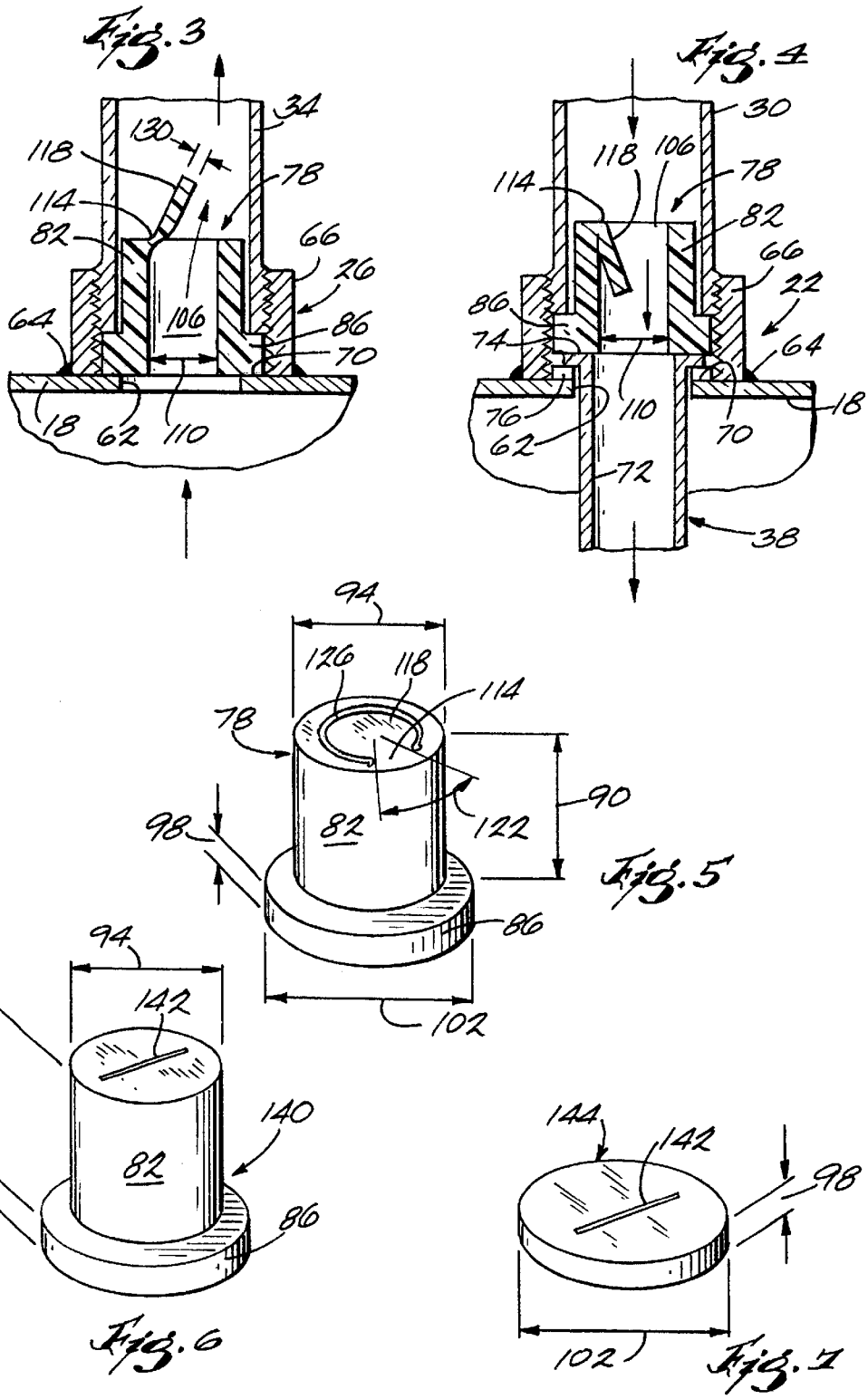

WATER HEATER HEAT TRAP

FIELD OF THE INVENTION

The invention relates to heat traps for water heaters.

BACKGROUND

It is known to provide a heat trap in a storage-type water heater to reduce heat losses from the heated water in the tank through water in the pipes communicating with the tank. Known heat traps have various constructions, including floating or sinking balls that seat against a seal to reduce heat losses when there is no flow of water through the pipes communicating with the water storage tank.

SUMMARY

Known heat traps are often orientation prone, and are therefore useful in only the inlet or outlet of the water heater. Known heat traps also often require a separate nipple or other part to bridge between the spud on the tank and the water pipe.

The present invention provides a water heater including a tank having a wall defining an opening, a spud connected to the wall and surrounding the opening, and a support surface defined within the spud. Preferably, the support surface is a portion of the tank wall extending inwardly of the spud. A heat trap is disposed at least partially within the spud and is supported by the support surface, and a pipe communicates with the spud. Preferably, a portion of the heat trap is captured between an end of the pipe and the support surface.

The heat trap includes a valve that opens upon the flow of fluid through the heat trap, and that closes in the absence of fluid flow through the heat trap. The heat trap may also include an elongated portion that acts as a dielectric between the pipe and the tank. The elongated portion may extend at least partially into the pipe.

One feature and advantage of the present invention is to provide a water heater having a spud surrounding an opening in a wall of the water heater such that the wall of the water heater provides a support surface within the spud to support a heat trap.

Another feature and advantage of the present invention is to provide a heat trap that may be inserted into and used with a spud without requiring a nipple or other adapter.

Another feature and advantage of the present is to provide a heat trap that includes a portion interposed between the end of the pipe and the support surface.

Another feature and advantage of the present invention is to provide a heat trap that acts as a dielectric between the pipe and the tank.

Other features and advantages of the invention will become apparent to those skilled in the art upon review of the following detailed description, claims, and drawings.

BRIEF DESCRIPTION OF THE DRAWINGS

FIG. 3 is an enlarged cross section view of a portion of FIG. 2.

FIG. 4 is an enlarged cross section view of another portion of FIG. 2.

FIG. 5 is a perspective view of the heat trap shown in FIGS. 3 and 4.

FIG. 6 is a perspective view of another heat trap according to the invention.

FIG. 7 is a perspective view of still another heat trap according to the present invention.

Figures 1, 2:
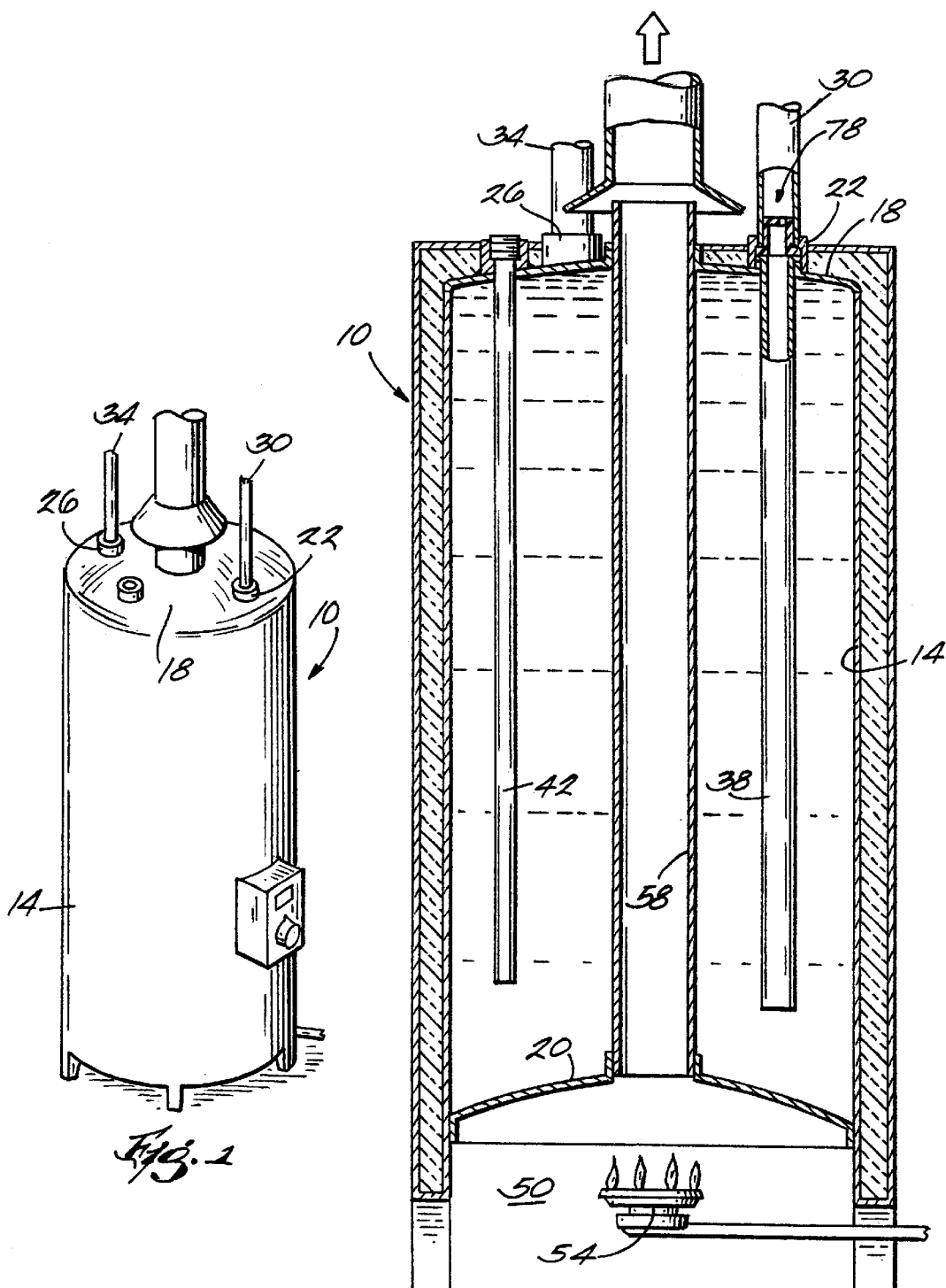
FIG. 1 is a perspective view of a water heater embodying the present invention.
FIG. 2 is an enlarged cross section view of the water heater of FIG. 1.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION OF THE PREFERRED EMBODIMENT

FIG. 1 illustrates a water heater 10 including a tank 14. The tank 14 has a top wall 18 and a bottom wall 20. The water heater 10 also includes inlet and outlet spuds 22, 26 mounted to the top wall 18, and inlet and outlet pipes 30, 34 threaded into and communicating with the inlet and outlet spuds 22, 26, respectively. The inlet pipe 30 delivers cold water under pressure to the tank 14. The outlet pipe 34 delivers hot water to faucets and other valves (not shown) during performance draws.

FIG. 2 illustrates further components of the water heater 10. The water heater 10 includes a dip tube 38 communicating with the inlet spud 22 and inlet pipe 30 for the introduction of cold water near the bottom wall 20 of the tank 14, and an anode rod 42 that reduces or eliminates the occurrence of corrosion of the tank walls. Hot water is drawn from the top of the tank 14 through the outlet spud 26. The manner in which the tube 38 is supported is described below. A combustion chamber 50 beneath the tank 14 has therein a gas burner 54. A flue 58 extends upwardly through the tank 14 to vent the products of combustion from the combustion chamber 50. The water is heated through the bottom wall 20 of the tank 14 and through the flue walls 58. The water heater 10 may be a power-vented water heater, and include a blower or fan (not shown) in communication with the flue tube 58 to force the flow of combustion products through the flue 58. The invention may also be embodied in an electric water heater having electric heating elements (not shown). An electric water heater would not require the burner 54 and flue tube 58.

FIGS. 3 and 4 better illustrate the outlet and inlet spuds 26, 22, respectively, on the top wall 18 of the tank 14. The top wall 18 includes openings 62, and each spud 22, 26 is mounted over a respective opening 62. The illustrated spuds 22, 26 are preferably mounted with welds 64 to the top wall 18 of the tank 14, and do not pierce the top wall 18. The spuds 22, 26 may alternatively be provided in another wall in the tank 14, such as a side wall. The spuds 22, 26 are substantially identical, and common elements have the same reference numerals.

Each spud 22, 26 includes an annular wall 66 surrounding the associated opening 62 and extending away from the top wall 18. The inner diameter of the wall 66 is larger than the diameter of the opening 62 such that the top wall 18 extends inward of the spud and provides a support surface 70 within the spud. The illustrated support surface 70 is ring-shaped and surrounds the opening 62 entirely. Alternatively, the spuds 22, 26 may include support surfaces in place of the support surfaces 70 defined by the top wall 18. If the spud provides the support surface, the spud may extend through the opening 62 in a wall of the tank 14 or be welded to the outside surface of a tank wall 18 as shown. Alternatively, the support surface 70 may include one or more protrusions or tabs extending radially inwardly of the spud wall 66.

The dip tube 38 includes an elongated tubular portion 72 and a flare or flange 74 on the upper end of the tubular portion 72. The flange 74 is supported by the support surface 70 in the spud 22 so that the tube 38 does not fall into the tank 14. A gasket 76 between the flange 74 and the support surface 70 substantially ensures a water-tight fit between the tube 38 and the spud 22. Each spud 22, 26 has therein a respective heat trap 78. The heat traps 78 are substantially identical, and common elements have the same reference numerals. In the outlet side, the heat trap 78 sits directly on the support surface 70.

The heat trap 78 illustrated in FIGS. 2–5 includes an elongated annular sleeve portion 82 and an enlarged diameter flange or base portion 86. As seen in FIG. 5, the sleeve portion 82 preferably has a length 90 of about 1 inch and preferably has an outer diameter 94 of about 0.74 inches. The length 90 of the sleeve portion 82 is selected to provide a dielectric function as discussed below. The outer diameter 94 is selected to fit into copper pipes. Because copper pipes typically have smaller inner diameters than galvanized pipes, the sleeve portion 82 may be inserted into either a copper pipe or a galvanized pipe. The base portion 86 preferably has a thickness 98 of about 0.156 inches, and an outer diameter 102 of about 0.925 inches. A central bore 106 (FIGS. 3 and 4) extends through the heat trap 78, and preferably has a diameter 110 of about 0.554 inches.

Referring to FIG. 5, the heat trap 78 includes a valve having a hinge portion 114 and a flap portion 118. The hinge portion 114 preferably has an arc length 122 of about 60°, and the flap portion 118 preferably has a diameter of about 0.50 inches, leaving about a 0.02 inch wide slit 126 around the flap portion 118. The flap portion 118 thickness 130 (FIG. 3) is preferably about 0.062 inches. The heat trap 78 is a unitary piece constructed of a material having low thermal conductivity, such as ethylene-propylene terpolymer (also known as "EPDM"), and is preferably molded. The valve is biased toward the closed position shown in FIGS. 2 and 5 by the resilient nature of the material, but may be deflected open in either direction as shown in FIGS. 3 and 4 and described below.

Referring again to FIGS. 3 and 4, the enlarged diameter portion 86 of the heat trap 78 sits on the flange 74 of the tube 38 (FIG. 4) or directly on the support surface 70 (FIG. 3). The pipes 30, 34 are threaded or otherwise inserted into the spuds 22, 26 such that the enlarged diameter portion 86 of each heat trap 78 is captured between the end of the pipe and the tube flange 74 (FIG. 4) or support surface 70 (FIG. 3). The heat trap 78 is thus supported within the inlet and outlet spuds 22, 26 by the support surface 70, and is captured within each spud 22, 26 between the pipe and the support surface 70.

When a faucet communicating with the outlet pipe 34 is opened, hot water is forced out of the water tank 14 through the spud 26 and pipe 34 by the pressurized cold water, and cold water is introduced to the tank 14 through the inlet pipe 30, inlet spud 22, and dip tube 38. The flow of water deflects the flap portions 118 of the heat traps 78 about the hinge portions 114 in the directions shown in FIGS. 3 and 4 as water passes through the spuds. Because the hinge portions 114 permit the flap portions 118 to deflect in both directions, a heat trap 78 may be used in either or both of the inlet and outlet spuds 22, 26. The sleeve portion 82 of each heat trap 78 acts as a dielectric shield between the pipe 30 or 34 and the tank 14. This is believed to reduce galvanic corrosion between the tank and the pipes 30, 34 and limit anode current draw. When the flow of water is stopped by closing the faucet, the resilient nature of the heat trap material causes the flap portions 118 of the heat traps 78 to return to the closed position.

When closed, the enlarged diameter portions 86 and flap portions 118, due to their low thermal conductivity, reduce the amount of heat transfer from the heated water in the tank 14 to the inlet and outlet pipes 30, 34 and to the air through conduction. Also, the flap portions 118 reduce convection currents that cause heated water in the tank 14 to rise into the pipes. The resiliency of the flap portions 118 resist deflection due to these convection currents. The flap portions 118 therefore reduce the effects of or eliminate convective loops between the cool water in the pipes 30, 34 and the heated water in the tank 14.

An alternative heat trap 140 is shown in FIG. 6. The heat trap 140 is substantially identical to the heat trap 78 of FIGS. 2–5, with the exception of the valve. Similar elements are labeled with the same reference numerals used in FIGS. 2–5. The valve shown in FIG. 6 is a slit-type valve instead of the hinge-type flap valve shown in FIGS. 2–5. The slit-type valve of FIG. 6 permits deflection on both sides of a slit 142 to open the slit 142 and permit the flow of water through the heat trap 140 in either direction. The slit-type valve automatically closes in the absence of fluid flow through the heat trap 140 to reduce heat losses from the heated water in the tank 14 to the water in the pipes 30, 34.

FIG. 7 illustrates an alternative heat trap 144 having a valve similar to the valve of FIG. 6. Alternatively, the hinge-type valve of FIGS. 2–5 may be provided in the heat trap 144. The alternative heat trap 144 shown in FIG. 7 has a diameter 118 substantially equal to the enlarged diameter portions 86 of the heat traps 78, 140 illustrated in FIGS. 2–6, but does not include a sleeve portion 82. The outer edge of the heat trap 144 is captured in the same manner as the portion 86, but the heat trap 144 does not extend appreciably into the pipes 30, 34.

What is claimed is:

1. A water heater comprising:

a tank having a wall defining an opening;

a water inlet tube extending through said opening and into said tank to provide water to said tank;

a spud connected to said wall and surrounding said opening;

a support surface defined by said tank wall within said spud;

a heat trap separate and distinct from said inlet tube and disposed at least partially within said spud, said heat trap including a sleeve portion and an enlarged diameter portion having a larger diameter than said opening in said tank wall such that said enlarged diameter portion is prevented from passing through said opening in said tank wall and into said tank, said heat trap being supported by said support surface outside of said tank, said heat trap including a valve that opens upon the flow of fluid through said heat trap, and that closes in the absence of fluid flow through said heat trap; and a pipe communicating with said spud.

2. The water heater of claim 1, wherein said pipe is threaded into said spud.

3. The water heater of claim 1, wherein said pipe has an end extending into said spud, and wherein said enlarged diameter portion of said heat trap is captured between said pipe end and said support surface.

4. The water heater of claim 1, wherein said sleeve portion of said heat trap extends into said pipe and acts as a dielectric shield between said tank and said pipe.

5. The water heater of claim 1, wherein said inlet tube has an elongated tubular portion and a flange portion, said flange portion being supported by said support surface to support said inlet tube within said tank, said enlarged diameter portion of said heat trap being interposed between said pipe and said flange portion of said inlet tube.

6. A water heater comprising:

a tank having a wall defining an opening;

a water inlet tube extending through said opening and into said tank to provide water to said tank.

a spud connected to said wall and surrounding said opening;

a support surface defined within said spud;

a heat trap separate and distinct from said inlet tube and disposed at least partially within said spud, said heat trap including a sleeve portion and an enlarged diameter portion, said heat trap being supported by said support surface, said heat trap including a valve that opens upon the flow of fluid through said heat trap, and that closes in the absence of fluid flow through said heat trap; and a pipe extending into said spud and having an end, wherein said heat trap includes a portion captured between said end and said support surface, said sleeve portion of said heat trap extending at least partially into said pipe and acting as a dielectric shield between said tank and said pipe.

7. The water heater of claim 6, wherein said pipe is threaded into said spud.

8. The water heater of claim 6, wherein said support surface is defined by said tank wall.

9. The water heater of claim 6, wherein said inlet tube has an elongated tubular portion and a flange portion, said flange portion being supported by said support surface to support said inlet tube within said tank, said enlarged diameter portion of said heat trap being interposed between said pipe and said flange portion of said inlet tube.

10. A water heater comprising:

a tank having a top wall defining a generally circular opening having an opening diameter, a water inlet tube extending through said opening and into said tank to provide water to said tank;

a spud having an inner diameter larger than the opening diameter, said spud being connected to said top wall outside of said tank and surrounding said opening such that a portion of said top wall provides a generally ring-shaped support surface within said spud;

a heat trap separate and distinct from said inlet tube and positioned entirely within said spud and entirely outside of said tank, said heat trap including a sleeve portion and an enlarged diameter portion having a diameter larger than said opening diameter but smaller than said spud inner diameter such that said heat trap is prevented from passing through said opening into said tank but is positionable within said spud, said heat trap including a valve that opens upon the flow of fluid through said heat trap, and that closes in the absence of fluid flow through said heat trap; and a pipe threaded directly into said spud such that said enlarged diameter portion of said heat trap is captured within said spud between an end of said pipe and said support surface.

11. The water heater of claim 10, wherein said enlarged diameter portion of said heat trap sits directly on said support surface such that said sleeve portion extends away from said tank and into said pipe, said sleeve portion of said heat trap acting as a dielectric shield between said tank and said pipe.

12. The water heater of claim 10, wherein said inlet tube includes an elongated portion having an outer diameter smaller than said opening diameter such that said elongated portion extends into said tank through said opening, and a top flange portion having an outer diameter larger than said opening diameter such that said flange portion is prevented from passing through said opening, said flange portion sitting directly on said support surface within said spud and outside of said tank, said enlarged diameter portion of said heat trap sitting directly on said flange portion of said inlet tube, wherein said flange portion of said inlet tube and said enlarged diameter portion of said heat trap are captured between said support surface and said pipe end.

* * * * *